United States Patent
Ng

(10) Patent No.: US 10,330,954 B2
(45) Date of Patent: Jun. 25, 2019

(54) FLIP-UP EYEGLASSES

(71) Applicant: ACTION EYEWEAR CORP., Taipei (TW)

(72) Inventor: Choon-Kheang Ng, Kedah (MY)

(73) Assignee: ACTION EYEWEAR CORP., Taipei (TW)

( * ) Notice: Subject to any disclaimer, the term of this patent is extended or adjusted under 35 U.S.C. 154(b) by 31 days.

(21) Appl. No.: 15/863,556

(22) Filed: Jan. 5, 2018

(65) Prior Publication Data
US 2019/0121166 A1    Apr. 25, 2019

(30) Foreign Application Priority Data
Oct. 19, 2017    (CN) .................... 2017 2 1348052 U

(51) Int. Cl.
*G02C 9/00*    (2006.01)
*G02C 7/08*    (2006.01)
*G02C 7/10*    (2006.01)

(52) U.S. Cl.
CPC .............. *G02C 9/00* (2013.01); *G02C 7/086* (2013.01); *G02C 7/088* (2013.01); *G02C 7/10* (2013.01)

(58) Field of Classification Search
CPC .......... G02C 9/00; G02C 7/086; G02C 7/088; G02C 9/02; G02C 9/04; G02C 5/02; G02C 5/04; G02C 5/22; G02C 5/2209; G02C 5/2263; G02C 7/08; G02C 7/10
USPC ...................... 351/59, 128, 130, 47, 57, 158
See application file for complete search history.

(56) References Cited

U.S. PATENT DOCUMENTS

| 3,575,497 | A | * | 4/1971 | Leblanc | G02C 7/10 |
| | | | | | 351/47 |
| 6,283,591 | B1 | * | 9/2001 | Chen | G02C 9/00 |
| | | | | | 351/47 |
| 6,827,438 | B1 | * | 12/2004 | Wang | G02C 9/04 |
| | | | | | 351/48 |
| 2004/0109129 | A1 | * | 6/2004 | Huang | G02C 9/00 |
| | | | | | 351/47 |
| 2004/0257523 | A1 | * | 12/2004 | Ifergan | G02C 9/00 |
| | | | | | 351/47 |
| 2005/0052612 | A1 | * | 3/2005 | Kidouchim | G02C 9/00 |
| | | | | | 351/47 |
| 2007/0126977 | A1 | * | 6/2007 | Cheng | G02C 9/00 |
| | | | | | 351/47 |

* cited by examiner

*Primary Examiner* — Jordan M Schwartz
(74) *Attorney, Agent, or Firm* — Li & Cai Intellectual Property (USA) Office

(57) ABSTRACT

A flip-up eyeglasses include a main eyeglass, a secondary eyeglass, and an elastic hook member. The main eyeglass has a main frame, and the bridge of the main frame is connected with a connecting member extending horizontally forward. The connecting member has two engaging slots and two rectangular-shaped positioning portions that are formed between the front edge of the connecting member and the two engaging slots. The secondary eyeglass has a secondary frame, and the bridge of the secondary frame forms two grooves. The elastic hook member has a sheet portion and two hook portions that are configured to be hooked onto the two positioning portions through the two engaging slots and to be abutted against the two grooves, such that the positioning portions are sandwiched by the bridge of the secondary frame and the hook portions of the elastic hook member.

9 Claims, 10 Drawing Sheets

FLIP-UP EYEGLASSES

BACKGROUND OF THE INVENTION

1. Field of the Invention

The present invention relates generally to eyeglasses, and more particularly, to flip-up eyeglasses.

2. Description of Related Art

Glasses are a very common accessory for the modern people. Whether they are used to adjust the eye's focus for distance vision or for a decorative purpose, glasses are irreplaceable items to most people. However, when people are doing outdoor activities under intensive sunlight, wearing sunglasses is not easy because they have worn a pair of glasses. They thus have to purchase an additional pair of sunglasses with vision correction effect, resulting in inconvenience as well as a financial burden to the users. Therefore, an eyeglass frame with a pivot on its central part is designed to cooperate with another eyeglass frame. However, because the pivot is not provided with a positioning structure, when the user folds the second eyeglass frame upward, it tends to fall off easily and causes difficulties in usage.

In this regard, the inventor of the present invention provides a solution to overcome the aforementioned drawbacks.

SUMMARY OF THE INVENTION

An object of the present invention is to provide flip-up eyeglasses that can overcome the aforementioned drawbacks.

In one aspect/configuration of flip-up eyeglasses according to the present invention, the flip-up eyeglasses are comprised of a main eyeglass, a secondary eyeglass, and an elastic hook member. The main eyeglass has a main frame, two outer ends of the main frame are connected with two temples, and the bridge region in the middle of the main frame is connected with a connecting member extending substantially horizontally forward. The connecting member has two engaging slots that are opposite to each other, and two rectangular-shaped positioning portions that are formed between the front edge of the connecting member and the two engaging slots. The secondary eyeglass has a secondary frame, and the upper edge of the bridge region in the middle of the secondary frame forms two grooves that are opposite to each other. The elastic hook member, which is disposed between the main frame and the secondary frame, has a sheet portion and two outward-bent hook portions formed on the upper edge of the sheet portion. The sheet portion is fixed to the inner side of the bridge region of the secondary frame, and the two hook portions are configured to be hooked onto the two positioning portions through the two engaging slots and to be abutted against the two grooves, such that the two positioning portions are sandwiched by the bridge region of the secondary frame and the two hook portions of the elastic hook member.

For the flip-up eyeglasses provided by the present invention, because the rectangular-shaped positioning portion of the connecting member can be sandwiched by the bridge of the secondary frame and the hook of the elastic hook member, the user is able to apply a small force to flip the secondary eyeglass upward, and the positioning of the secondary eyeglass is extremely accurate after being flipped upward.

For a better understanding of the present invention, the following embodiments are provided along with illustrations to facilitate the disclosure of the present invention

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

First Embodiment

Figure 1:
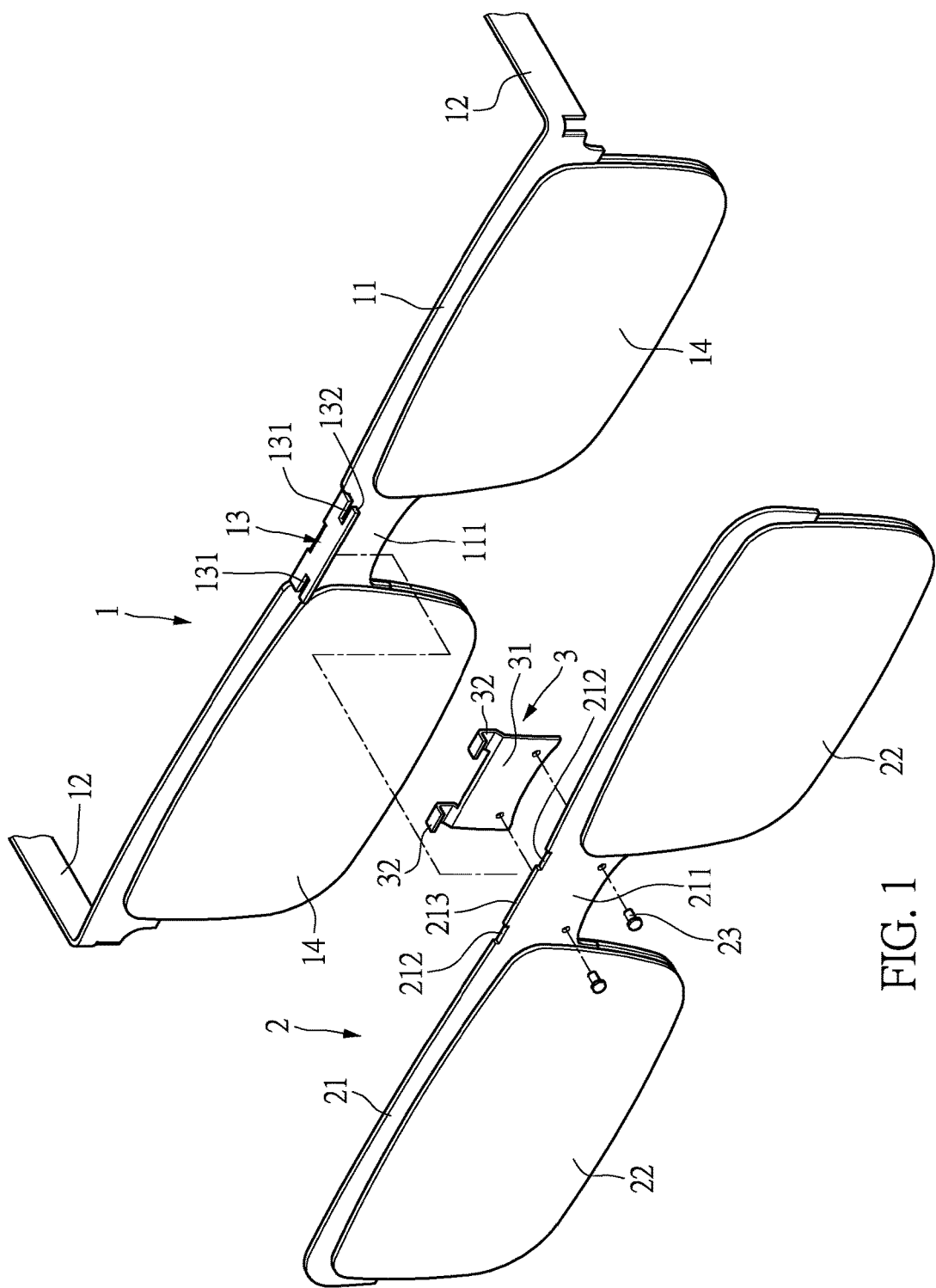
FIG. 1 is an exploded view (1) of flip-up eyeglasses according to a first embodiment of the present invention.
Figure 2:
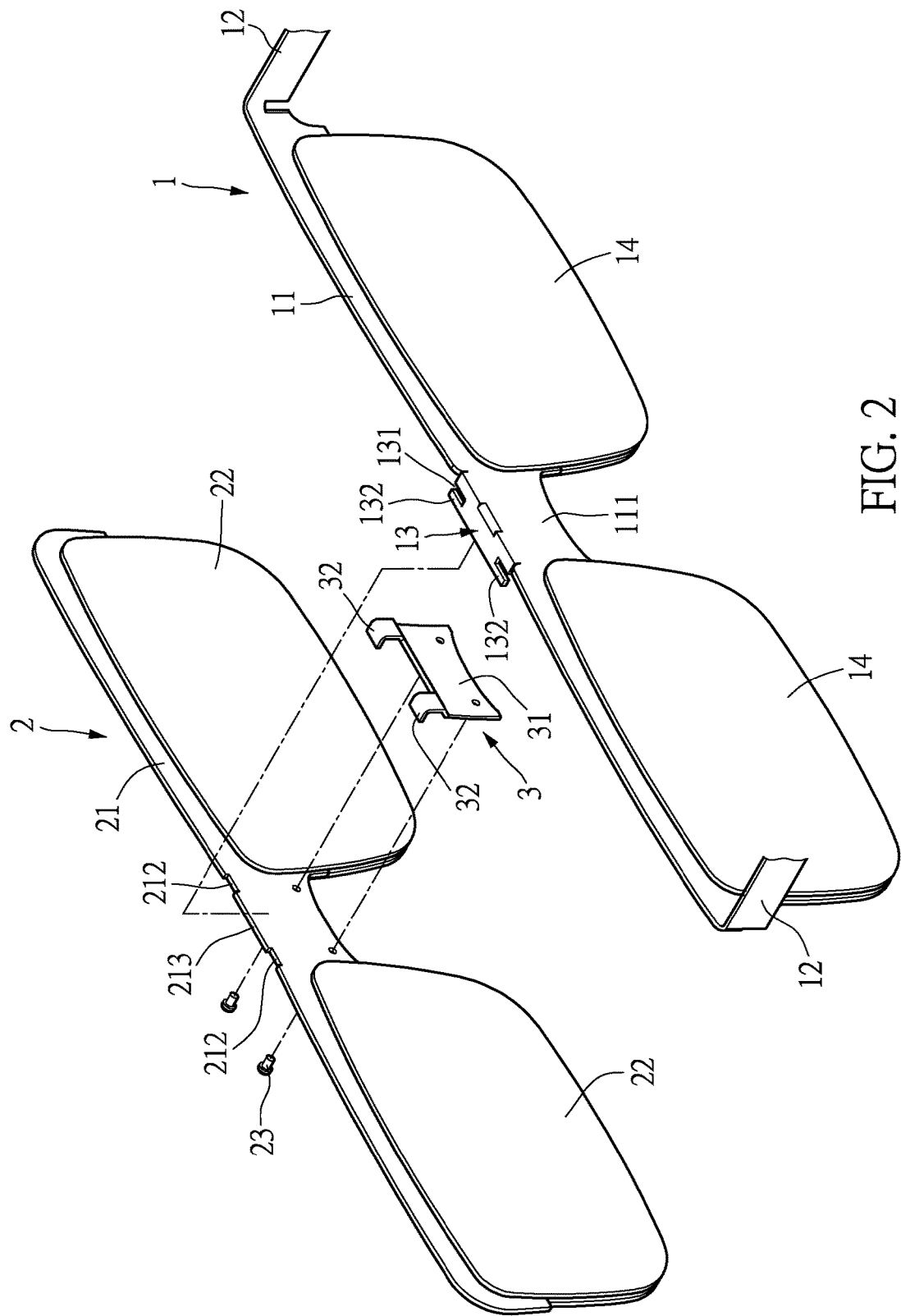
FIG. 2 is an exploded view (2) of flip-up eyeglasses according to a first embodiment of the present invention.
Figure 3:
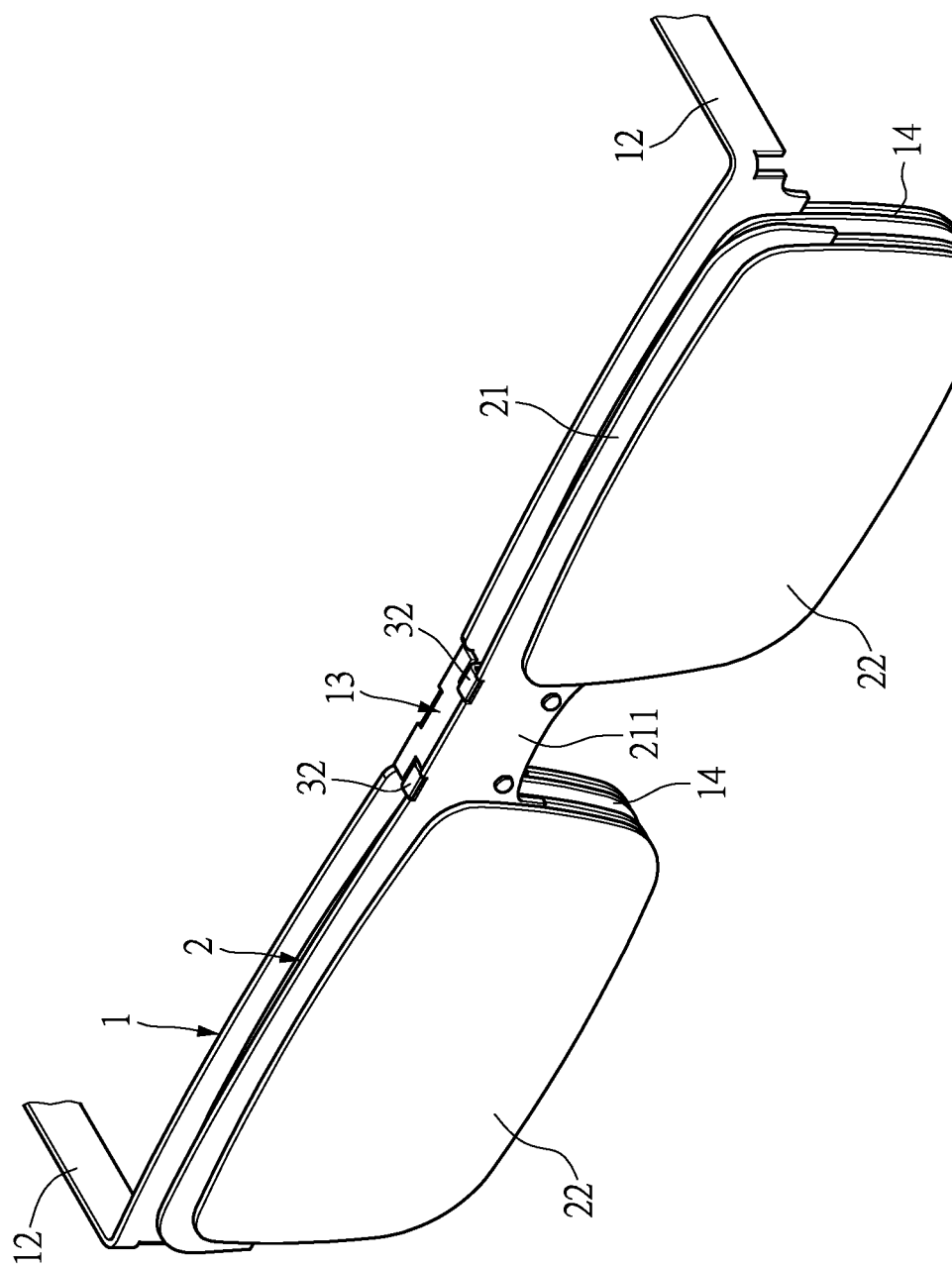
FIG. 3 is a perspective view (1) of flip-up eyeglasses according to a first embodiment of the present invention.
Figure 4:
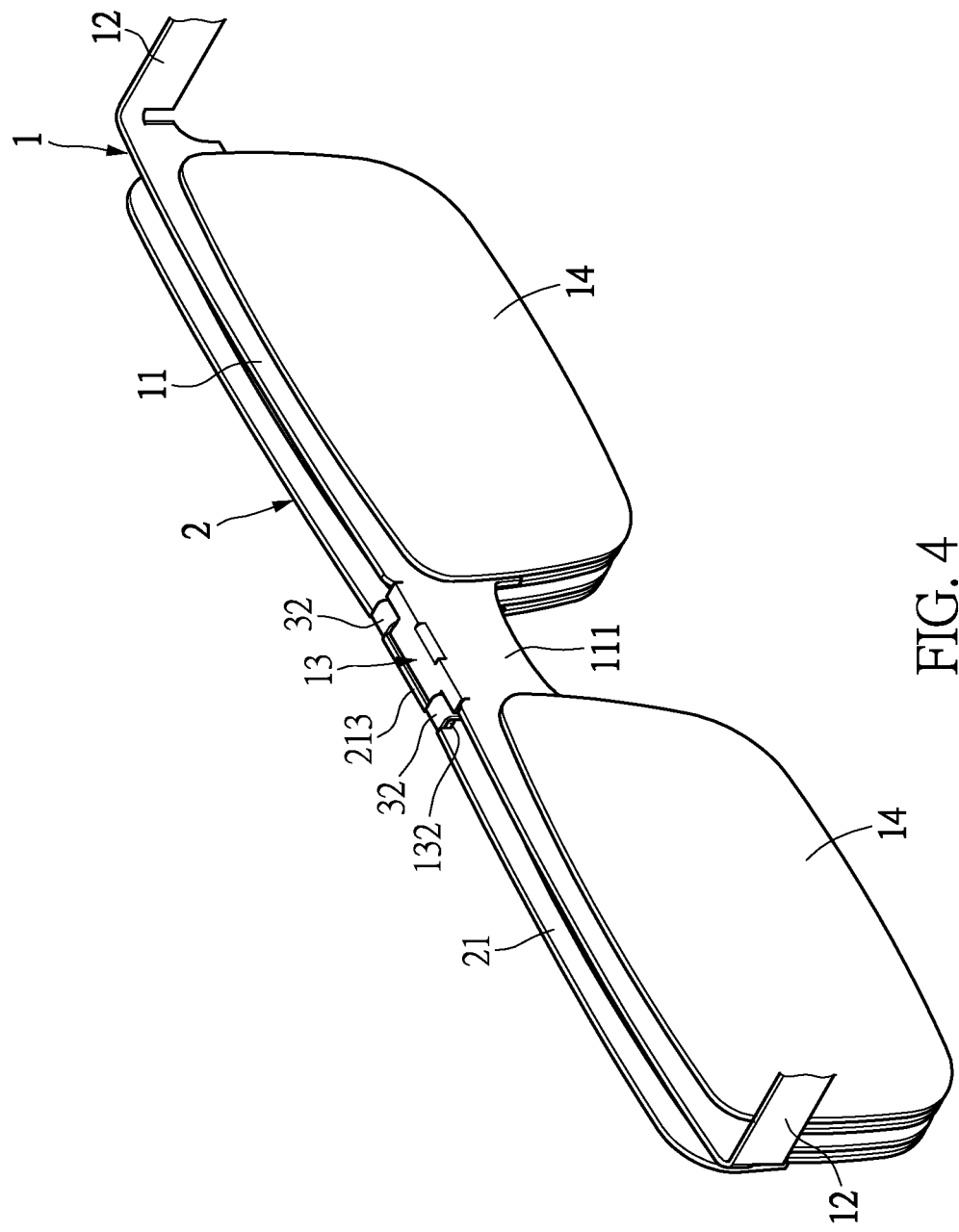
FIG. 4 is a perspective view (2) of flip-up eyeglasses according to a first embodiment of the present invention.

Referring to FIGS. 1 to 7, the flip-up eyeglasses provided according to the first embodiment of the present invention are shown. As shown in FIG. 1, the flip-up eyeglasses provided by the present invention mainly include a main eyeglass 1, a secondary eyeglass 2, and an elastic hook member 3.

The main eyeglass 1 has a main frame 11 made of ultra-light metals such as aluminum alloy and titanium alloy.

The two outer ends of the main frame 11 are connected with two temples 12, and the bridge region 111 in the middle of the main frame 11 is connected with a connecting member 13 extending horizontally forward. The connecting member 13 has two engaging slots 131 that are opposite to each other, and two rectangular-shaped positioning portions 132 that are formed between the front edge of the connecting member 13 and the two engaging slots 131. In this embodiment, the rear edge of the connecting member 13 is integrally connected to the upper edge of the bridge region 111 of the main frame 11. In addition, the outer shape of the main frame 11 and the nose pads shown in the figures can be appropriately changed according to actual needs, and the present invention is not limited thereto.

The main eyeglass 1 is loaded with a pair of first lenses 14 corresponding to the main frame 11. The pair of first lenses 14 may be concave lenses, but it may also be, to which the present invention is not limited, presbyopia lenses or astigmatism lenses.

The secondary eyeglass 2 has a secondary frame 21 also made of ultra-light metals. The upper edge of the bridge region 211 located in the middle of the secondary frame 21 forms two opposite grooves 212, and the two grooves 212 form a stopper portion 213 there-between. The stopper portion 213 is designed to be abutted against the surface of the connecting member 13 when the secondary eyeglass 2 is flipped upward.

The secondary eyeglass 2 is loaded with a pair of second lenses 22 corresponding to the secondary frame 21, and the pair of second lenses 22 may be sunglass lenses, but it may also be, to which the present invention is not limited, presbyopia lenses or astigmatism lenses.

The elastic hook member 3 is disposed between the main frame 11 and the secondary frame 21. The elastic hook member 3 has a sheet portion 31 and two outward-bent hook portions 32 formed on the upper edge of the sheet portion 31. The sheet portion 31 is fixed to the inner side of the bridge region 211 of the secondary frame 21, and the two hook portions 32 are designed to be hooked onto the two positioning portions 132 of the connecting member 13 through the two engaging slots 131 of the connecting member 13 and to be abutted against the two grooves 212 at the upper edge of the bridge region 211 of the secondary frame 21, such that the two positioning portions 132 are sandwiched by the bridge region 211 of the secondary frame 21 and the hook portion 32 of the elastic hook member 3. The positioning portion 132 sandwiched between the secondary frame 21 and the elastic hook member 3 forms a hinge axis.

The lower part of the sheet portion 31 of this embodiment is fixed to the inner side of bridge region 211 of the secondary frame 21 with two rivets 23. In other embodiments, the lower part of the sheet portion 31 may also be fixed to the inner side of the bridge region 211 of the secondary frame 21 in a snap-fit manner.

Figure 5:
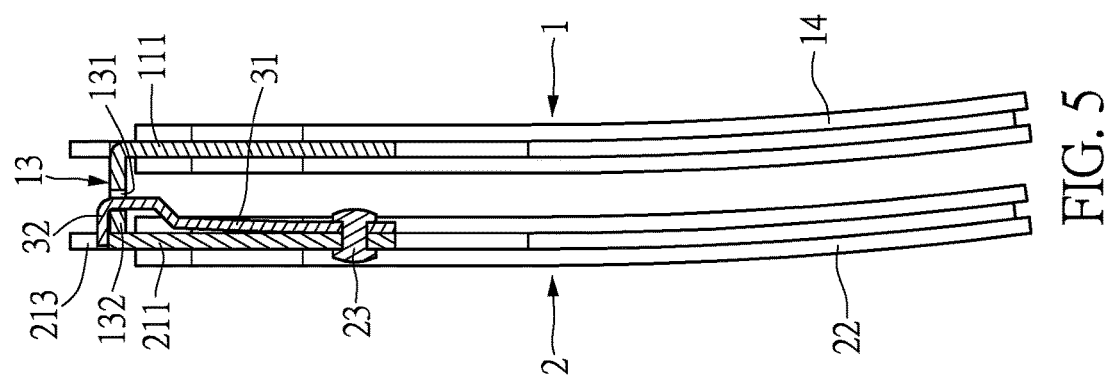
FIG. 5 is a schematic diagram (1) illustrating the action of the flip-up eyeglasses according to a first embodiment of the present invention.
Figure 6:
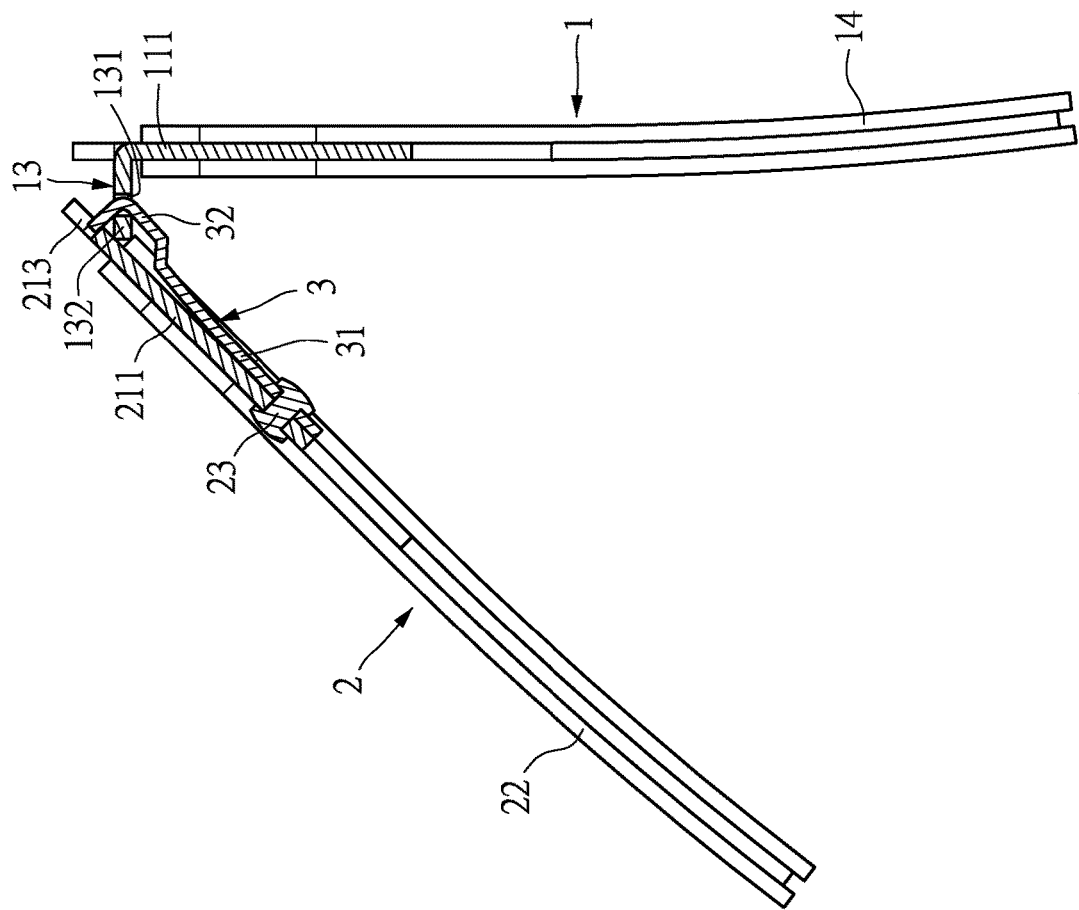
FIG. 6 is a schematic diagram (2) illustrating the action of the flip-up eyeglasses according to a first embodiment of the present invention.
Figure 7:
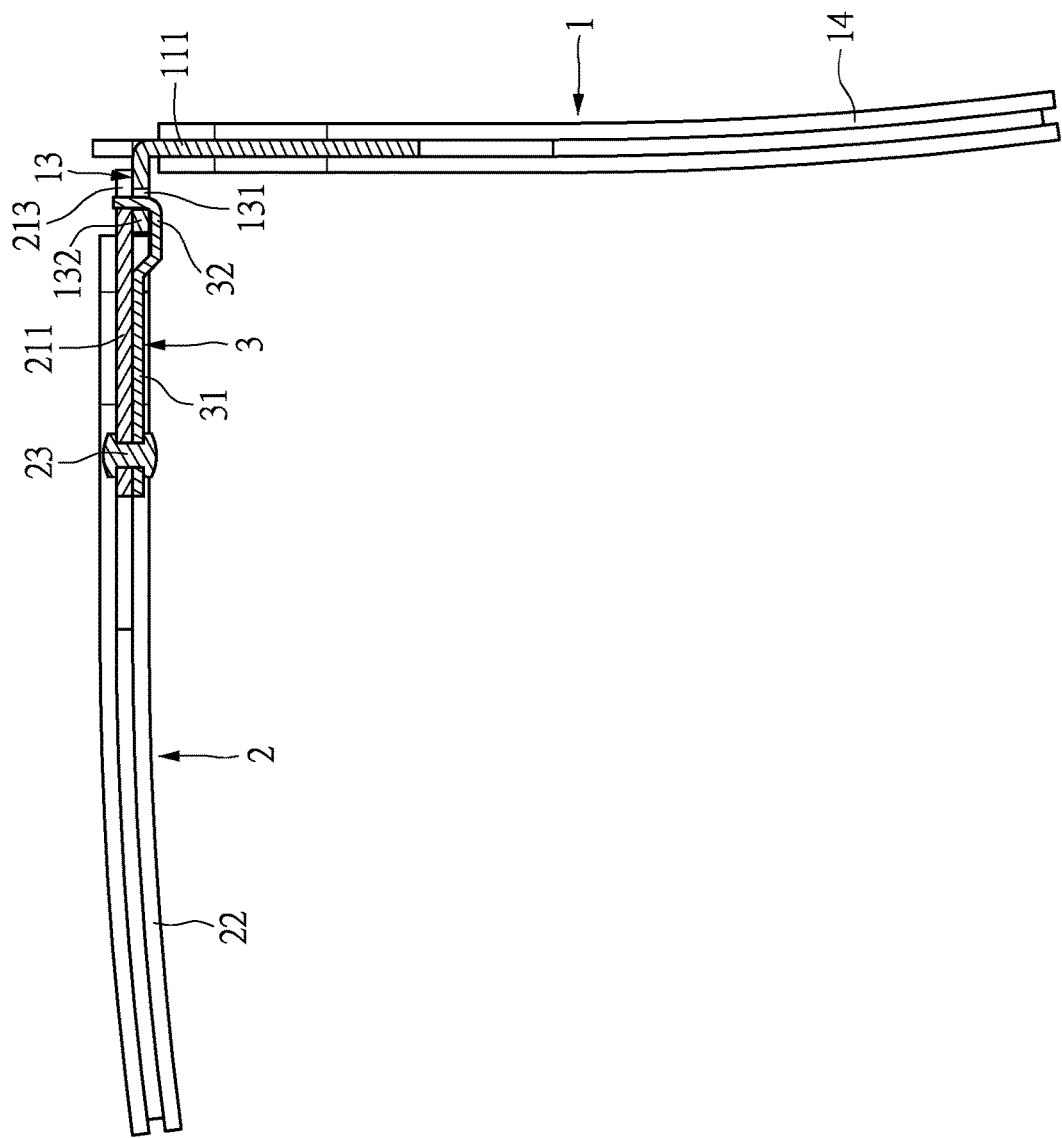
FIG. 7 is a schematic diagram (3) illustrating the action of the flip-up eyeglasses according to a first embodiment of the present invention.
Figure 8:
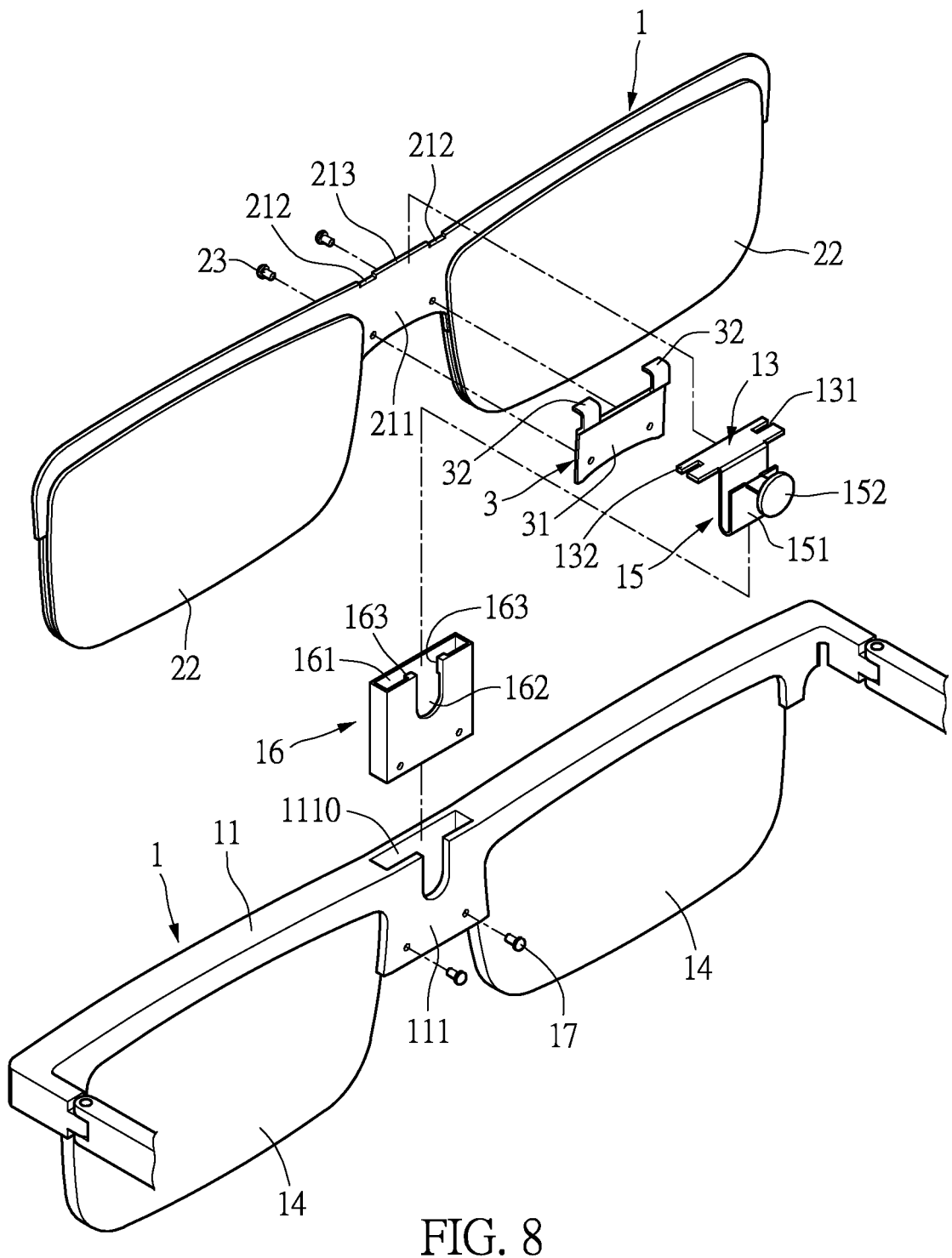
FIG. 8 is an exploded view of flip-up eyeglasses according to a second embodiment of the present invention.
Figure 9:
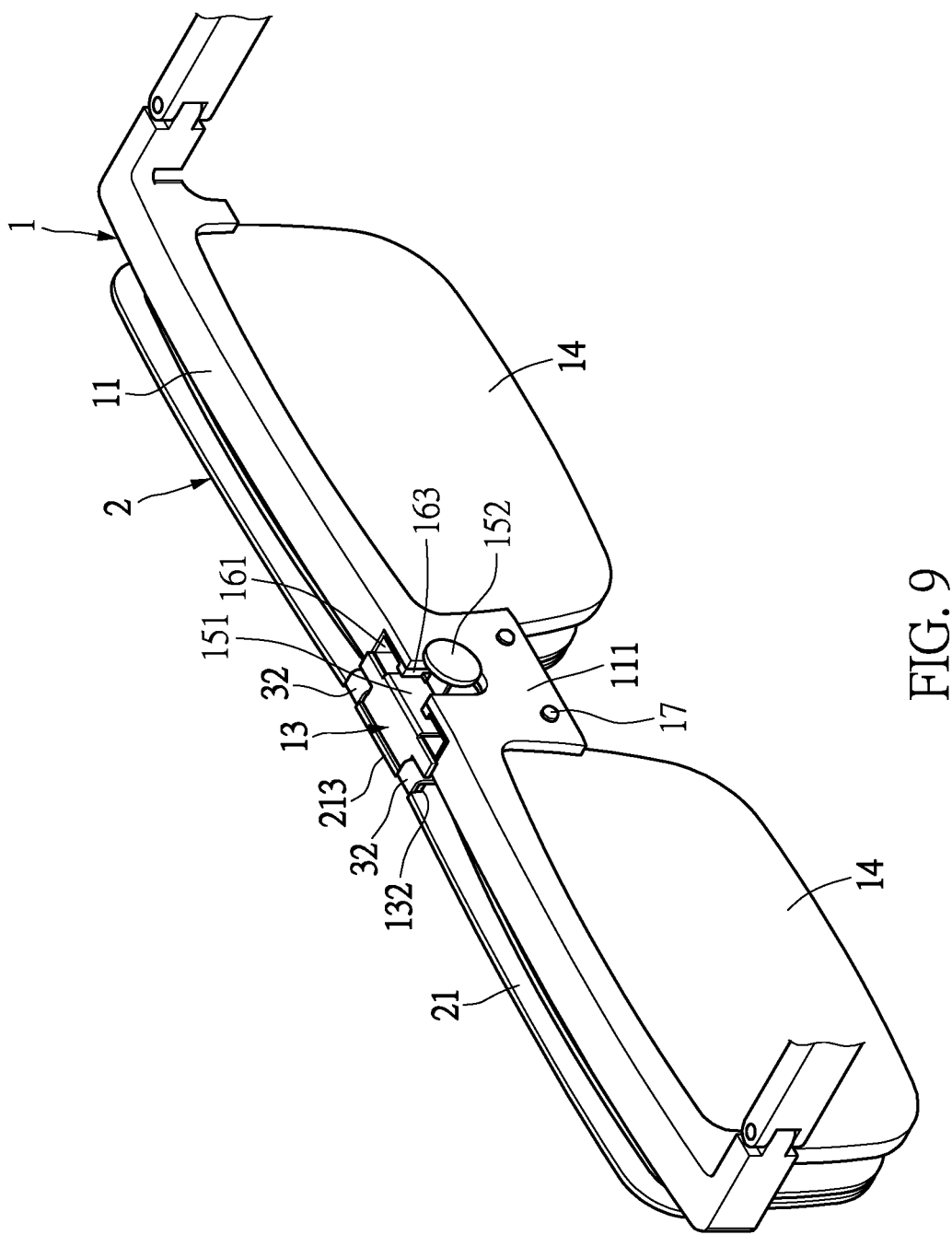
FIG. 9 is a perspective view of flip-up eyeglasses according to a second embodiment of the present invention.

When flipping the secondary eyeglass 2 upward, as shown in FIG. 5 to FIG. 7, the hook portion 32 of the elastic hook member 3 rotates by using the positioning portion 132 as a fulcrum to drive the positioning portion 132 to push the hook portion 32 and generate an elastic rebound force. In addition, the elastic rebound force of the elastic hook member 3 drives the secondary eyeglass 2 to rotate clockwise, so that the user only needs to apply a small force to push the secondary eyeglass 2 outward (as shown in FIG. 6). The elastic rebound force of the elastic hook member 3 drives the secondary eyeglass 2 to rotate clockwise to be in the open state (as shown in FIG. 7). Furthermore, because the bridge region 211 and the positioning portion 132 are flat surfaces lying against each other and so are the hook portion 32 and the positioning portion 132, the positioning of the secondary eyeglass 2 is extremely accurate after being flipped upward.

By contrast, when flipping the secondary eyeglass 2 downward, as shown in FIG. 7 to FIG. 5, the hook portion 32 of the elastic hook member 3 rotates by using the positioning portion 132 as a fulcrum to push the positioning portion 132 against the hook portion 32 and generate an elastic rebound force. Furthermore, the elastic rebound force of the elastic hook member 3 drives the secondary eyeglass 2 to rotate counter-clockwise, so that the user only needs to apply a small force to push the secondary eyeglass 2 downward (as shown in FIG. 6) and the rebound force of the elastic hook member 3 to drive the secondary eyeglass 2 to rotate counter-clockwise to be in the folded state (as shown in FIG. 5). All in all, the secondary eyeglass 2 only requires a small force to complete the opening or folding operations.

Second Embodiment

Referring to FIGS. 8 to 11, the flip-up eyeglasses provided according to the second embodiment of the present invention are shown. In order to allow the secondary eyeglass 2 to be separated from the main eyeglass 1 or be replaced with secondary eyeglass 2 of different styles, the rear edge of the connecting member 13 of this embodiment is connected with an elastic fastener 15, so that the connecting member 13 can be detachably connected to the bridge region 111 of the main frame 11 through the elastic fastener 15.

In details, the elastic fastener 15 has a U-shaped elastic sheet 151 and a press button 152 formed by extending backward from the backward-bent edge of the U-shaped elastic sheet 151. In addition, the main frame 11 of the main eyeglass 1 of this embodiment is made of plastic materials, so an accommodating slot 1110 can be formed concavely in the bridge region 111, and the accommodating slot 1110 accommodates a fastener box 16. The fastener box 16 is riveted onto the accommodating slot 1110 using the rivet 17, and the fastener box 16 has a guiding slot 161 and a concave hole 162 formed at a side wall of the guiding slot 161. The two side edges of the concave hole 162 extend toward the guiding slot 161 to form two latches 163.

Figure 10:
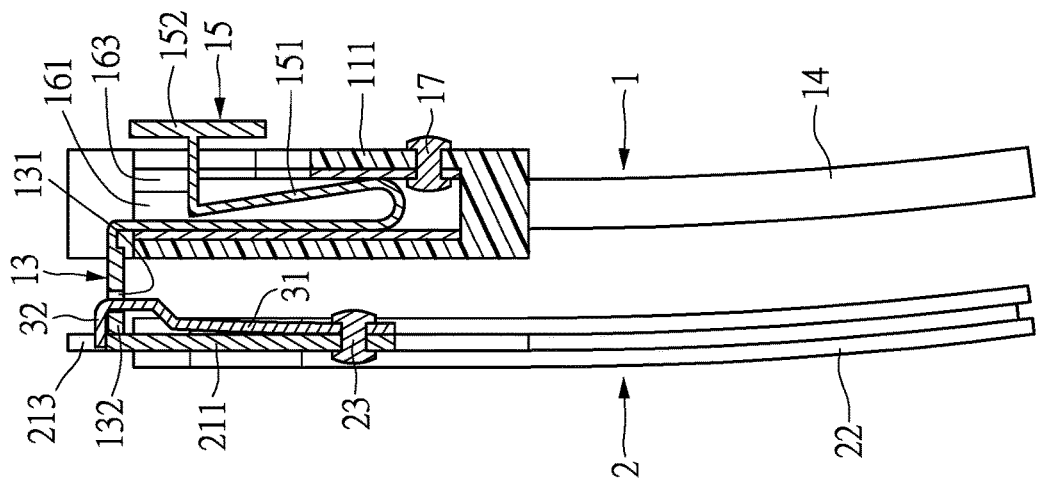
FIG. 10 is a schematic diagram (1) illustrating the action of the flip-up eyeglasses according to a second embodiment of the present invention.
Figure 11:
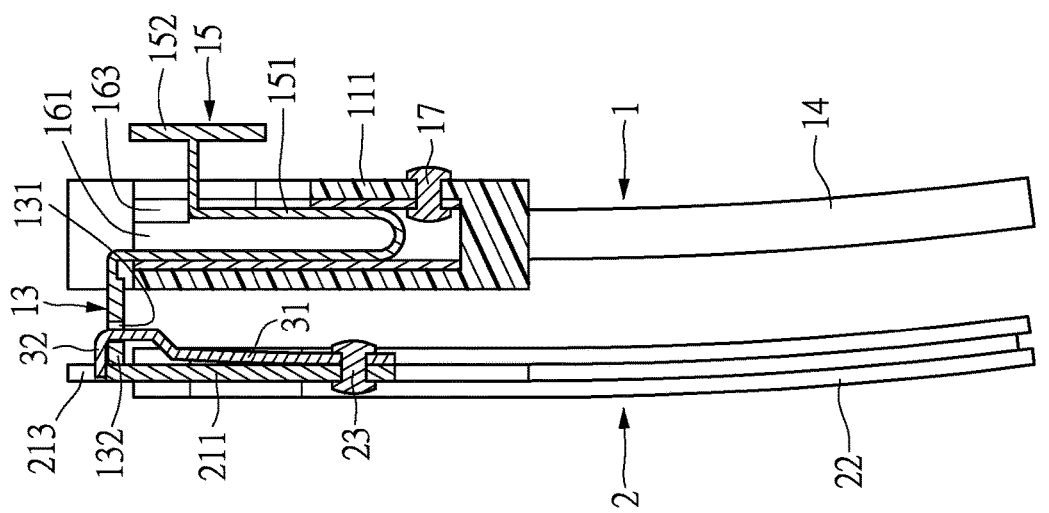
FIG. 11 is a schematic diagram (2) illustrating the action of the flip-up eyeglasses according to a second embodiment of the present invention.

As shown in FIG. 10, the U-shaped elastic sheet 151 can be flexibly inserted into the guiding slot 161. When the end edge of the U-shaped elastic sheet 151 abuts against the lower ends of the two latches 163, the latching is achieved. The press button 152 may then be exposed through the concave hole 162, and the press button 152 is configured to press the U-shaped elastic sheet 151 inward to separate it from the lower ends of the two latches 163. Therefore, as shown in FIG. 11, the press the button 152 is pushed inward so that the end edge of the U-shaped elastic sheet 151 is separated from the lower end of the latch 163. At this moment, the U-shaped elastic sheet 151 can be removed from the fastener box 16 to separate the secondary eyeglass 2 from the main eyeglass 1. In this embodiment, the secondary eyeglass 2 is not only provided with the flip-up function, but also separated from the main eyeglass 1 according to the usage need or for avoiding structural damage. Furthermore, the user can replace the secondary eyeglass 2 with different styles of secondary eyeglass, so that the secondary eyeglass 2 can be loaded with lenses of different colors or functions for more choices.

The descriptions illustrated supra set forth simply the preferred embodiments of the present invention; however, the characteristics of the present invention are by no means restricted thereto. All changes, alterations, or modifications conveniently considered by those skilled in the art are deemed to be encompassed within the scope of the present invention delineated by the following claims.

What is claimed is:
1. A flip-up eyeglasses, comprising:
a main eyeglass having a main frame, wherein two outer ends of the main frame are connected with two temples, and a bridge region in the middle of the main frame is connected with a connecting member extending substantially horizontally forward, and wherein the con- necting member has two engaging slots that are opposite to each other, and two rectangular-shaped positioning portions that are formed between a front edge of the connecting member and the two engaging slots;

a secondary eyeglass having a secondary frame, wherein an upper edge of a bridge region in the middle of the secondary frame forms two grooves that are opposite to each other; and an elastic hook member disposed between the main frame and the secondary frame, wherein the elastic hook member has a sheet portion and two outward-bent hook portions formed on a upper edge of the sheet portion, the sheet portion is fixed to an inner side of the bridge region of the secondary frame, and the two hook portions are configured to be hooked onto the two positioning portions through the two engaging slots and to be abutted against the two grooves, such that the two positioning portions are sandwiched by the bridge region of the secondary frame and the two hook portions of the elastic hook member.

2. The flip-up eyeglasses according to claim 1, wherein a rear edge of the connecting member is integrally connected to an upper edge of the bridge region of the main frame.

3. The flip-up eyeglasses according to claim 1, wherein the main eyeglass is loaded with a pair of first lenses corresponding to the main frame, and the secondary eyeglass is loaded with a pair of second lenses corresponding to the secondary frame.

4. The flip-up eyeglasses according to claim 1, wherein a lower part of the sheet portion is fixed to the inner side of the bridge region of the secondary frame with at least one rivet.

5. The flip-up eyeglasses according to claim 1, wherein a rear edge of the connecting member is connected with an elastic fastener, and the connecting member is detachably connected to the bridge region of the main frame through the elastic fastener.

6. The flip-up eyeglasses according to claim 5, wherein the elastic fastener has a U-shaped elastic sheet and a press button formed by extending backward from the backward-bent edge of the U-shaped elastic sheet.

7. The flip-up eyeglasses according to claim 6, wherein an accommodating slot is formed concavely in the bridge region of the main frame, and the accommodating slot accommodates a fastener box; wherein the fastener box has a guiding slot and a concave hole formed at a side wall of the guiding slot, and two side edges of the concave hole extend toward the guiding slot to form two latches.

8. The flip-up eyeglasses according to claim 7, wherein the U-shaped elastic sheet is configured to be flexibly inserted into the guiding slot to abut against lower ends of the two latches.

9. The flip-up eyeglasses according to claim 8, wherein the press button is configured to press the U-shaped elastic sheet inward to separate the U-shaped elastic sheet from the lower ends of the two latches.

\* \* \* \* \*